United States Patent [19]

Dyer et al.

[11] Patent Number: 5,442,922
[45] Date of Patent: Aug. 22, 1995

[54] FUEL STAGING SYSTEM

[75] Inventors: Gerald P. Dyer, Enfield; Brian G. Donnelly, Suffield; Charles E. Reuter, Granby, all of Conn.

[73] Assignee: United Technologies Corporation, Hartford, Conn.

[21] Appl. No.: 165,097

[22] Filed: Dec. 9, 1993

[51] Int. Cl.6 ............................................... F02C 7/22
[52] U.S. Cl. ...................................... 60/739; 60/740
[58] Field of Search .................. 60/734, 739, 740, 741

[56] References Cited

U.S. PATENT DOCUMENTS

| | | | |
|---|---|---|---|
| 4,411,137 | 10/1983 | Pearce | 60/739 |
| 4,449,548 | 5/1984 | Tutherly | 137/468 |
| 4,745,739 | 5/1988 | Bezard et al. | 60/39.281 |
| 4,817,389 | 4/1989 | Holladay et al. | 60/739 |
| 4,920,740 | 5/1990 | Shekleton | 60/739 |
| 4,949,538 | 8/1990 | Iasillo et al. | 60/39.465 |
| 5,114,115 | 5/1992 | Gillott | 251/26 |
| 5,226,287 | 7/1993 | Ng | 60/739 |
| 5,289,685 | 3/1994 | Hoffa | 60/739 |

*Primary Examiner*—Louis J. Casaregola
*Attorney, Agent, or Firm*—McCormick, Paulding & Huber

[57] ABSTRACT

In a fuel staging system, metered fuel from a fuel metering unit is directed into a fuel inlet line coupled to a sequence valve. A minimum pressure valve maintains the pressure of the fuel flowing through the fuel inlet line at a minimum pressure above the low pressure of the system in order to ensure sufficient force margins to stroke the sequence valve. A main fuel manifold is coupled downstream of the sequence valve, and a plurality of main fuel nozzles are each coupled to the main fuel manifold through a respective main nozzle shut-off valve. A first set of pilot nozzles is coupled to the main fuel manifold through the sequence valve, and a second set of pilot nozzles is coupled to the main fuel manifold through the sequence valve. At low engine speeds, in the first and/or second pilot open positions, fuel flows to either pilot nozzle through the main fuel manifold, and the main fuel nozzles are isolated from the main fuel manifold by the main nozzle shut-off valves. Then, at higher engine speeds, the main nozzle shut-off valves are opened, and the sequence valve splits the fuel flow from the fuel inlet line between the main fuel manifold and the first and second pilot nozzles. The fuel in the main fuel manifold flows to the main fuel nozzles, and the remainder of the fuel split off by the sequence valve flows to the first and second pilot nozzles.

19 Claims, 2 Drawing Sheets

FUEL STAGING SYSTEM

FIELD OF THE INVENTION

The present invention relates to fuel staging systems for directing fuel flow to several stages of a combustion process, and more particularly, to fuel staging systems for directing fuel flow to at least two sets of fuel nozzles, such as in a gas turbine engine.

BACKGROUND OF THE INVENTION

In order to significantly reduce nitrogen oxide ($NO_x$) emissions from gas turbine engines, multiple combustion chambers are typically employed within the burner section of an engine. Fuel is introduced to each combustion chamber through one or more respective nozzles, and the sets of nozzles are typically referred to as pilot nozzles and main nozzles. At low fuel flow rates, fuel is fed only to one or more of the pilot nozzles, whereas at higher fuel flow rates, fuel is fed or staged to one or more main nozzles in addition to the pilot nozzles.

One known system for metering fuel to two sets of nozzles is shown, for example, in U.S. Pat. No. 4,949,538 to Iasillo et al. In this system, a conventional flow metering unit (FMU) meters the total fuel flow required by the engine, and a downstream staging valve divides the total fuel flow, directing a portion to the pilot nozzles, and the remainder to the main nozzles. When a main nozzle is initially activated, the fuel flow to the corresponding pilot nozzle(s) is temporarily diverted to the main nozzle flow path until the main nozzle flow path, typically including a nozzle manifold, is filled with fuel. As a result, although the fuel system is attempting to increase the flow of fuel to the combustion chambers, the overall flow of fuel to the combustion chambers is temporarily reduced in an aircraft application, this condition is not acceptable.

It is an object of the present invention to overcome the drawbacks and disadvantages of prior art fuel staging systems.

SUMMARY OF THE INVENTION

According to one aspect of the present invention, a fuel staging system comprises a fuel inlet line, and a first fuel manifold coupled in fluid communication with the fuel inlet line to receive fuel flowing through the fuel inlet line. A first fuel nozzle is coupled in fluid communication with the first fuel manifold to receive fuel flowing through the first fuel manifold. A first valve is coupled between the first fuel manifold and the first fuel nozzle, in order to control the flow of fuel between the first fuel manifold and the first fuel nozzle. A second fuel nozzle of the system is coupled in fluid communication with the first fuel manifold, in order to receive fuel flowing through the first fuel manifold.

According to another aspect of the present invention, a fuel staging system of the foregoing type further comprises a second valve coupled in fluid communication between the first fuel manifold and the second fuel nozzle, in order to control the flow of fuel between the first fuel manifold and the second fuel nozzle.

According to another aspect of the present invention, a fuel staging system of the foregoing type further comprises a third fuel nozzle coupled in fluid communication to the first fuel manifold through the second valve, and the second valve controls the flow of fuel from the first fuel manifold to the third fuel nozzle.

In one embodiment of the present invention, the second valve defines at least one first valve position for directing the flow of fuel from the fuel inlet line, through the first fuel manifold, and to the second fuel nozzle. The second valve also defines at least one second valve position for splitting the flow of fuel from the first fuel manifold between the second and third fuel nozzles. Preferably, the second valve also defines at least one split flow position for splitting the flow of fuel from the fuel inlet line between the first fuel manifold and the second and third fuel nozzles.

In one embodiment of the present invention, the second valve is a sequence valve including a valve member received within a hollow interior of the valve, and the position of the valve member is adjustable to control the flow of fuel through the sequence valve.

One advantage of the present invention, is that fuel always flows through the main fuel manifold, even when only one or more of the pilot nozzles are open. Accordingly, when the main nozzles are initially opened, the main fuel manifold is primed with fuel, and there is no interruption of fuel flow to the pilot nozzles.

Other advantages of the present invention will become apparent in view of the following detailed description and accompanying drawings.

DETAILED DESCRIPTION OF THE PREFERRED EMBODIMENT

Figure 1:
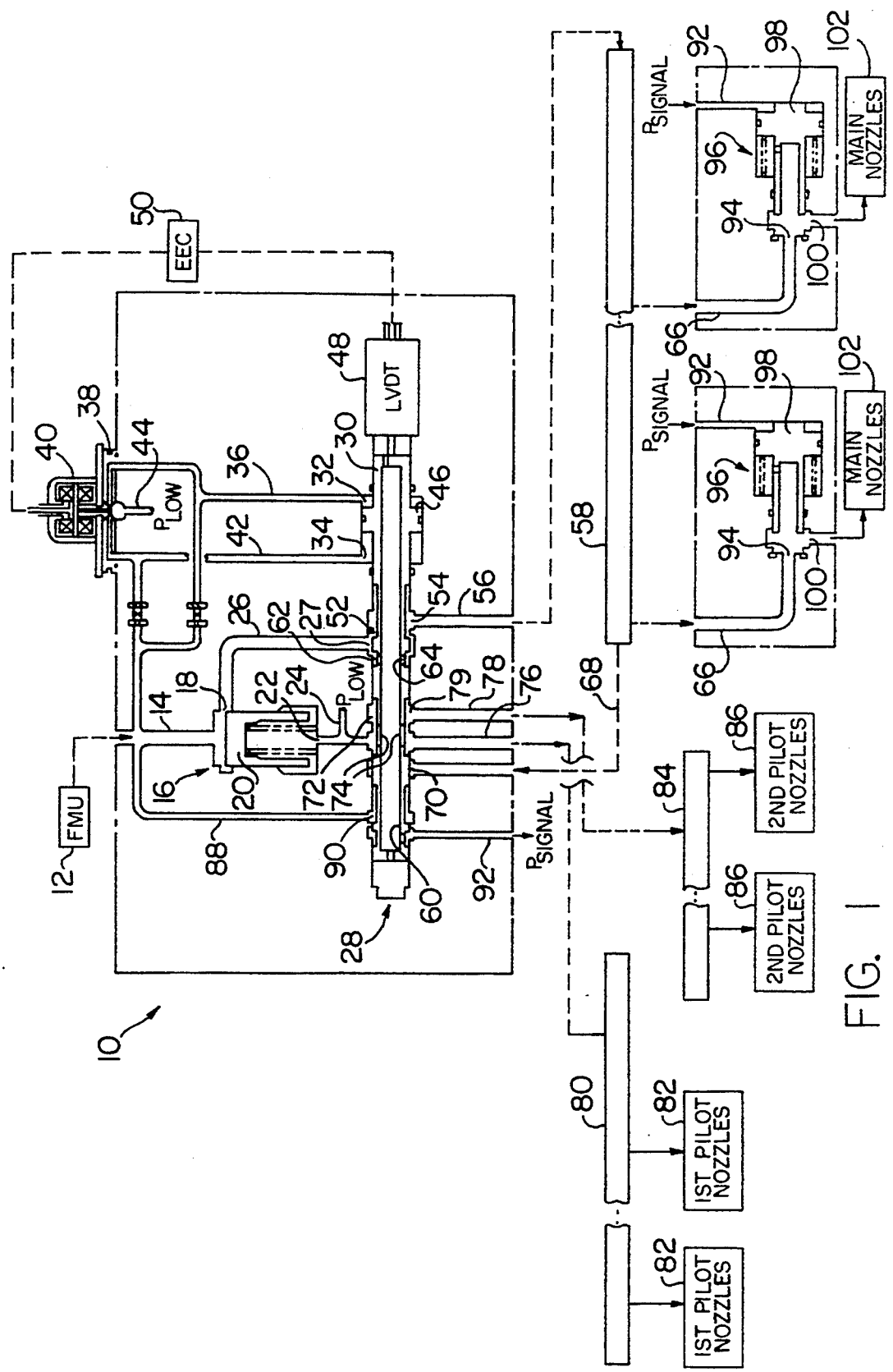
FIG. 1 is a simplified schematic illustration of a fuel staging system embodying the present invention.

In FIG. 1, a fuel staging system embodying the present invention is indicated generally by the reference numeral 10. A fuel metering unit (FMU) 12 directs metered fuel flow into a first fuel inlet line 14 coupled to the inlet port of a minimum pressure valve 16. The minimum pressure valve 16 is of a type known to those of ordinary skill in the art, and includes an outlet port 18, a spring-biased valve member 20 seated between the inlet and outlet ports, and a low pressure port 22 on the backside of the valve. The low pressure port 22 is coupled to a low pressure line 24, which is in turn coupled to a low pressure source ($P_{low}$). The minimum pressure valve 16 maintains minimum pressure differential between the metered fuel flowing through the first inlet line 14 and the low pressure source of the system ($P_{low}$). This minimum pressure differential is essentially equal to the pressure applied by the spring of the spring-biased valve member 18, and is selected to provide a sufficient fuel pressure to operate hydraulic components of the fuel staging system, as is described further below.

The outlet port 18 of the minimum pressure valve 16 is coupled to one end of a second fuel inlet line 26, the other end of which is coupled to an inlet port 27 of a sequence valve 28. The sequence valve 28 defines a hollow interior, and includes an axially-elongated valve member 30 slidably received within the hollow interior. One end of the sequence valve 28 defines a first pressure port 32, and a second pressure port 34 axially spaced relative to the first pressure port 32. The first pressure port 32 is coupled through a line 36 to one side of a flapper system 38, which is driven by a double-acting torque motor 40. The second pressure port 34 is coupled through a line 42 to the other side of the flapper system 38 relative to the line 36, as shown in FIG. 1. The flapper system 38 is also coupled to the low pressure source ($P_{low}$) by a low pressure line 44.

Depending on the position of the flapper system 38, which is controlled by operation of the torque motor 40, the pressure differential between the lines 36 and 42, and thus between the first pressure port 32 and second pressure port 34, can be manipulated. The valve member 30 of the sequence valve 28 defines an annular flange portion 46 located between the first and second pressure ports 32 and 34, respectively. By manipulating the pressure differential between the first and second pressure ports 32 and 34, respectively, the position of the annular flange 46, and thus of the valve member 30 can be axially manipulated to control the fuel flow through the sequence valve, as is described further below.

A linear variable displacement transducer (LVDT) 48 is coupled to the valve member 30, and transmits signals to an electronic engine control (EEC) 50 indicative of the axial position of the valve member. The EEC 50 is coupled to the torque motor 40, and is responsive to the signals transmitted by the LVDT 48 to control the torque motor in order to drive the flapper system 38, and in turn adjust the pressure differential between the first and second pressure ports 32 and 34, respectively, so as to control the axial position of the valve member 30.

The sequence valve 28 defines a first window 52 coupled in fluid communication with the inlet port 27, and defining an annular passageway extending between the inlet port 27 and an outlet port 54. The outlet port 54 is coupled to one end of a main fuel line 56, coupled on the other end to a main fuel manifold 58.

The valve member 30 defines an axially elongated passageway 60 formed along the axis of the valve member, and extending from substantially one closed end of the valve member to the other, as shown in FIG. 1. Each closed end of the valve member defines a passageway extending through the end of the valve member to permit low pressure fuel to flow therethrough, as also illustrated in FIG. 1. The sequence valve 28 also defines a second window 62 axially spaced relative to the first window 52 on generally the opposite side of the inlet port 27 relative to the first window. The second window 62 extends through the wall of the valve member 30, and is coupled in fluid communication with the axial passageway 60. A second outlet port 64 is located on a diametrically opposite side of the valve member 30 relative to the second window 62, and is formed through the wall of the valve member in fluid communication with the axial passageway. The second outlet port 64 is also coupled in fluid communication with the outlet port 54 and main fuel line 56, as shown in FIG. 1.

The main manifold 58 is coupled to one end of each of a plurality of main nozzle lines 66, shown typically in FIG. 1, and to one end of a main pilot line 68. The other end of the main pilot line 68 is coupled to a third window 70 of the sequence valve 28, which is axially spaced relative to the first and second windows 52 and 62, respectively. The valve member 30 defines an annular recess forming an annular passageway 72 within the sequence valve and located adjacent to the third window 70, as shown in FIG. 1. Two ports 74 are formed through the wall of the valve member 30 on diametrically opposite sides of the valve member relative to each other, and are each coupled in fluid communication with the annular passageway 72. The annular passageway 72 is also coupled in fluid communication with the low pressure line 24 for receiving low pressure fuel, which flows through the annular passageway, and in turn through the ports 74 into the internal passageway 60 of the valve member.

A first pilot line 76 is coupled to the sequence valve 28 and is axially spaced adjacent to the main pilot line 68 in fluid communication with the third window 70. A second pilot line 78 is also coupled to the sequence valve 28, axially spaced adjacent to the first pilot line 76, and coupled in fluid communication with the sequence valve through a fourth window 79. Depending upon the position of the valve member 30, and thus whether or not the third window 70 and fourth window 79 are open, the first and second pilot lines 76 and 78, respectively, are coupled in fluid communication with the annular passageway 72 to receive fuel flowing therethrough. The other end of the first pilot line 76 is coupled to a first pilot manifold 80, which is in turn coupled to a first set of pilot nozzles 82. The other end of the second pilot line 78 is coupled to a second pilot manifold 84, which is in turn coupled to a second set of pilot nozzles 86.

A first signal pressure line 88 is coupled on one end to the fuel inlet line 14, and the sequence valve 28 defines an annular passageway 90 coupled in fluid communication with the other end of the first signal pressure line for receiving high pressure fuel from the fuel inlet line. A second signal pressure line 92 is coupled to the sequence valve 28 axially adjacent to the first signal pressure line 88, and depending on the position of the valve member 30, can be coupled in fluid communication with the annular passageway 90 to receive high pressure fuel from the first signal pressure line 88.

The other end of each main nozzle line 66 is coupled to an inlet port 94 of a respective main nozzle shut-off valve 96. Each shut-off valve 96 includes a spring-biased valve member 98 located between an inlet port 94 and an outlet port 100, and which is normally biased in the open position, as illustrated in FIG. 1. The backside of each shut-off valve 96 is coupled to a branch of the second signal pressure line 92 to receive high pressure fuel, and in turn drive the respective valve member 98 into a closed position, in response to selected actuation of the sequence valve 28, as is described further below. In the open position of each shut-off valve 96, fuel from the main manifold 58 flows from the respective main nozzle fuel line 66, through the outlet port 100 of the shut-off valve, and to a respective main nozzle 102.

In the operation of the above-described fuel staging system of the present invention, metered fuel flowing from the FMU 12 enters the first fuel inlet line 14, and flows into the minimum pressure valve 16. The minimum pressure valve 16 sets the inlet fuel pressure to a minimum value above the system low pressure ($P_{low}$) in order to ensure sufficient force margins to stroke the sequence valve 28. Thus, a portion of the fuel flowing into the first fuel inlet line 14 flows through the outlet port 18 of the minimum pressure valve 16, and into the second fuel inlet line 26. The remainder of the high pressure fuel from the first fuel inlet line 14 flows into the first signal pressure line 88, in order to control the main nozzle shut-off valves 96, as is described further below.

The fuel flowing through the second fuel inlet line 26, flows into the inlet port 27 of the sequence valve 28. The position of the sequence valve 28 is controlled by the EEC 50, based on the signals transmitted by the LVDT 48 indicative of the position of the valve member 30. The EEC 50 is responsive to the signals transmitted by the LVDT 48 to control the torque motor 40 in order to adjust the flapper system 38. This in turn adjusts the pressure differential between the first and second pressure ports 32 and 34, respectively, in order to control the position of the valve member 30, and thus control the flow of fuel through the sequence valve. In the embodiment of the present invention illustrated, depending upon operating conditions, the EEC 50 positions the sequence valve 28 in at least three different positions corresponding to i) the first pilot nozzles 82 open, ii) the second pilot nozzles 86 open, and iii) a variable split between the main nozzles 102 and pilot nozzles 82 and 86.

Figure 2:
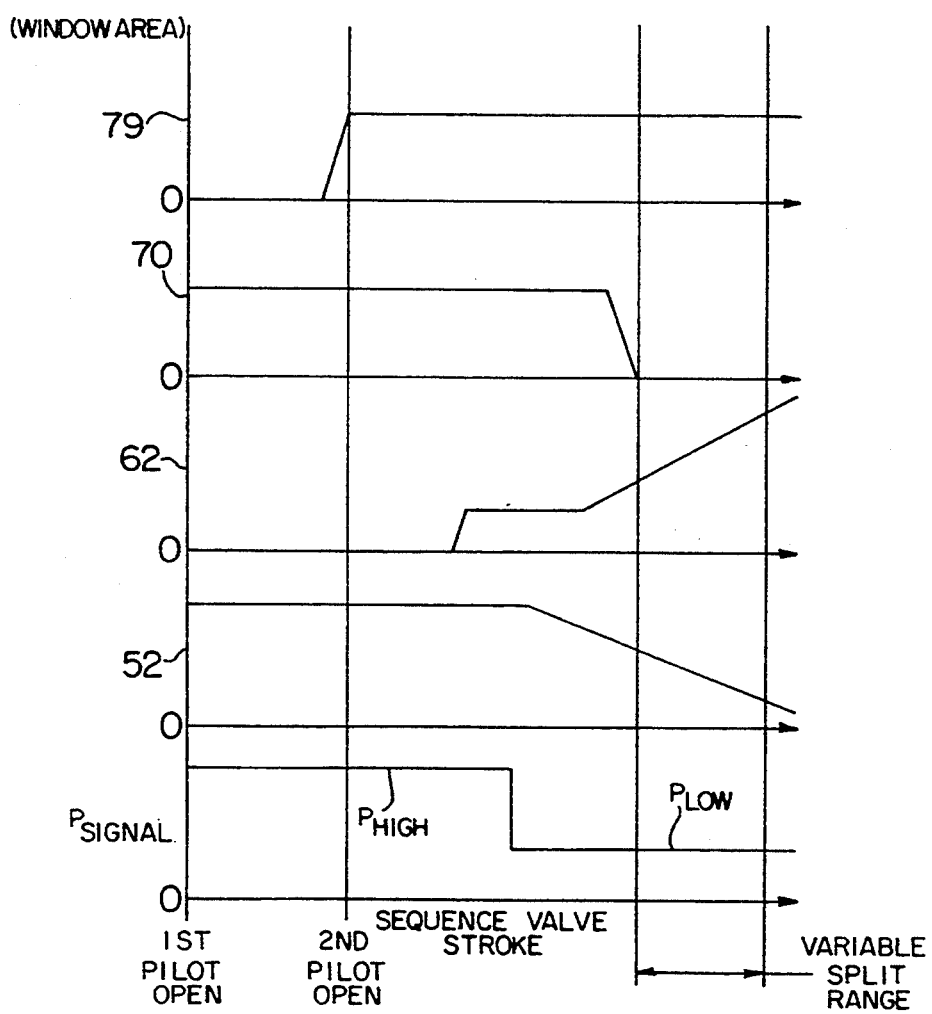
FIG. 2 is a graphical illustration of the different flow positions of the sequence valve of the fuel staging system of FIG. 1.

The window positions of the sequence valve 28 in the first, second and variable split positions, and the condition of the second signal pressure line 92 in each of these positions, are illustrated graphically in FIG. 2. The horizontal axis indicates the position of the sequence valve 28, and the vertical axis indicates the window area of each of the respective windows (52, 62, 70 and 79) and the pressure level within the second signal pressure line 92 (the $P_{signal}$) at each of the respective sequence valve positions. As can be seen, in the first position in which the first pilot nozzles 82 are open, the first window 52 is open, the second window 62 is closed, the third window 70 is open, and the fourth window 79 is closed. Also, a high pressure signal ($P_{high}$) is transmitted to the backside of each main nozzle shut-off valve 96 to maintain the main nozzle shut-off valves in the closed position, and thus prevent the flow of fuel to the main nozzles 102.

Accordingly, in the first position, all of the metered fuel from the second inlet line 26 flows through the first window 52, the outlet port 54, the main fuel line 56, and into the main manifold 58. The EEC 50 also positions the valve member 30 so that the first signal pressure line 88 is coupled in fluid communication with the second signal pressure line 92, which in turn directs high pressure fuel into the backside of each main nozzle shut-off valve 96, and closes these valves. Fuel flow in the main manifold 58 is therefore isolated from the main nozzles 102, and the high pressure signal from the sequence valve 28 to the backside of each main nozzle shut-off valve 96 holds these valves shut, providing drop tight sealing. All of the metered fuel in the main manifold 58 therefore flows through the main pilot line 68, the third window 70 of the sequence valve 28, into the first pilot line 76, through the first pilot manifold 80, and to the first pilot nozzles 82. Thus, in the first position, all of the metered fuel flow is directed to the first pilot nozzles 82, and the rate of this fuel flow is controlled by the FMU 12.

In the second position, the fuel flow is split between the first and second pilot nozzles 82 and 86, respectively. Accordingly, as illustrated in FIG. 2, in the second position, the first window 52 is open, the second window 62 is closed, the third window 70 is open, and the fourth window 79 is open. Also, the high pressure signal continues to be transmitted to the backside of each of the main nozzle shut-off valves 96 to keep the valves closed, and ensure that no metered flow is directed to the main nozzles 102.

The fuel in the second inlet line 26 therefore flows through the inlet port 27 of the sequence valve 28, through the first window 52, the outlet port 54, the main fuel line 56, and into the main manifold 58. Because the main nozzle shut-off valves 96 are closed, all of the fuel in the main manifold 58 flows into the main pilot line 68, and is split between the third window 70 and fourth window 79. The fuel then flows through the first pilot line 76, the first pilot manifold 80, and to the first pilot nozzles 82, and simultaneously flows through the second pilot line 78, the second pilot manifold 84, and to the second pilot nozzles 86. The flow split between the first and second pilot nozzles 82 and 86, respectively, is controlled based on the degree to which the fourth window 79 is opened (i.e., the window cross-sectional area) and the relative sizes of the pilot nozzles.

When the EEC 50 strokes the valve member 30 of the sequence valve into the variable split range, the metered fuel flow is split between the first and second pilot nozzles 82 and 86, and the main nozzles 102. As shown graphically in FIG. 2, in the variable split range, the pressure signal to the backside of each main nozzle shut-off valve 96 is low, indicating that the valve member 30 is adjusted to close the flow path for the first signal pressure line 88 through the sequence valve 28. Only low pressure fuel therefore flows from the interior passageway 60 of the valve member 30 into the second signal pressure line 92, and to the backside of each main nozzle shut-off valve 96, thus opening the main nozzle shut-off valves. Also, the first window 52 is open, the second window 62 is open, the third window 70 is closed, and the fourth window 79 is open, as illustrated FIG. 2.

The metered flow from the second inlet line 26 flows through the inlet port 27 of the sequence valve, and simultaneously through both the first window 52 and second window 62. The split of fuel flow between the first and second windows 52 and 62, respectively, depends on the relative degree to which the windows are opened (i.e., the relative cross-sectional areas of the windows). The greater the degree to which a respective window is opened, the greater is the fuel flow through that window in comparison to the other window, and vice-versa.

The fuel flow through the first window 52 flows through the annular passageway, the outlet port 54, the main fuel line 56, the main manifold 58, and to the main nozzles 102. Because the third window 70 is closed, the fuel in the main manifold 58 does not flow through the main pilot line 68 and to the pilot nozzles. Rather, the fuel flowing through the second window 62 flows into the internal passageway 60 of the valve member, through the ports 74, and is then split between the first pilot line 76 and the second pilot line 78. The split between the two pilot lines is controlled based on the area of the fourth window 79 and the relative sizes of the pilot nozzles. The fuel then flows through each pilot line, through the respective pilot manifolds, and to the respective pilot nozzles.

One advantage of the above-described fuel staging system of the present invention, is that there is no interruption of fuel flow to the pilot nozzles when the main nozzles are initially opened. Because in the first and second pilot open positions, the fuel to the pilot nozzles flows through the main manifold, the main manifold is always primed with fuel. Thus, when the sequence valve is stroked to the variable split range to direct fuel to the main nozzles, the main manifold is already filled with fuel, and there is no interruption of fuel flow to the pilot nozzles as is typically associated with prior art fuel staging systems, which must first prime the main manifold when the main nozzles are initially opened.

Another advantage of the above-described fuel staging system of the present invention, is that the fuel is always flowing through the main manifold during engine operation, even when the main nozzles are closed, thus maintaining the fuel at a lower temperature in the main manifold, and preventing coking of the fuel in the main manifold.

Another advantage of the above-described fuel staging system of the present invention, is that a minimum pressure valve is employed which uses metered fuel flow to generate the relative high and low fuel pressures necessary for sequence valve operation. This feature eliminates the necessity for additional plumbing between the FMU, for example, and the fuel staging system for high and low pressure fuel lines. Also, these self-generated high and low pressures do not add internal leakage to the fuel metering system through staging unit torque motor flappers. If FMU pressures were used, on the other hand, internal leakage would likely increase, and a larger fuel pump would likely be required. These features are particularly advantageous when the fuel staging system of the present invention is retrofitted to an existing FMU.

As will be recognized by those skilled in the art, numerous modifications may be made to the above-described fuel staging system without departing from the scope of the present invention as defined in the appended claims. For example, although the above-described embodiment of the present invention splits the metered fuel flow between a first set of main nozzles and two sets of pilot nozzles, it could be easily modified to accommodate additional splits. For example, for each additional split, another nozzle shut-off valve and associated valve signal pressure line, and another split window on the sequence valve could be added.

What is claimed is:

1. A fuel staging system comprising:
    a fuel inlet line;
    a first fuel manifold coupled in fluid communication with the fuel inlet line to receive fuel flowing through the fuel inlet line;
    a first fuel nozzle coupled in fluid communication with the first fuel manifold to receive fuel flowing through the first fuel manifold;
    a first valve coupled between the first fuel manifold and the first fuel nozzle to control the flow of fuel between the first fuel manifold and the first fuel nozzle;
    a second fuel nozzle coupled in fluid communication with the first fuel manifold to receive fuel flowing through the first fuel manifold; and
    a second valve coupled in fluid communication between the first fuel manifold and the second fuel nozzle for controlling fuel flow between the first fuel manifold and the second fuel nozzle, the second valve also being coupled in fluid communication between the fuel inlet line and the first fuel manifold for controlling fuel flow between the fuel inlet line and the first fuel manifold.

2. A fuel staging system as defined in claim 1, further comprising a third fuel nozzle coupled in fluid communication to the first fuel manifold through the second valve, wherein the second valve controls the flow of fuel from the first fuel manifold to the third fuel nozzle.

3. A fuel staging system as defined in claim 1, further comprising a minimum pressure valve coupled in fluid communication with the fuel inlet line for maintaining the pressure of fuel flowing through the fuel inlet line at a minimum pressure differential above a low pressure value of the fuel staging system.

4. A fuel staging system as defined in claim 1, wherein the second valve defines a first valve position for directing the flow of fuel from the fuel inlet line, through the first fuel manifold, and to the second fuel nozzle.

5. A fuel staging system as defined in claim 2, wherein the second valve defines a position for splitting the flow of fuel from the first fuel manifold between the second and third fuel nozzles.

6. A fuel staging system as defined in claim 2, wherein the second valve is also coupled in fluid communication between the fuel inlet line and the first fuel manifold, and defines a split flow position splitting the flow of fuel from the fuel inlet line between the first fuel manifold and the second and third fuel nozzles.

7. A fuel staging system as defined in claim 2, wherein the second valve is a sequence valve including a valve member received within the sequence valve, and wherein the position of the valve member is adjustable to control the flow of fuel through the sequence valve.

8. A fuel staging system as defined in claim 7, wherein the second valve defines a first window coupled in fluid communication with the first fuel manifold, and a second window coupled in fluid communication with at least one of the second and third fuel nozzles, and the areas of the first and second windows are adjustable relative to each other by movement of the valve member to control the split of fuel between the first fuel nozzles and at least one of the second and third fuel nozzles.

9. A fuel staging system as defined in claim 7, wherein the valve member defines a window coupled in fluid communication with the second fuel nozzle, and another window coupled in fluid communication with the third fuel nozzle, the areas of the two windows being adjustable relative to each other by movement of the valve member to control the split of fuel between the second and third fuel nozzles.

10. A fuel control system comprising:
    a sequence valve including a housing defining a hollow interior, an inlet port for receiving fuel flow into the sequence valve, an axially-movable valve member received within the hollow interior, wherein the axial position of the valve member is adjustable to control the flow of fuel through the sequence valve, and the valve member defines a first window coupled in fluid communication with the inlet port for receiving fuel flowing through the inlet port, and the area of the first window is adjustable by axial movement of the valve member to adjust the flow rate of fuel through the first window, and the valve defines a first outlet port coupled in fluid communication with the first window for receiving fuel flowing through the first window, and wherein the valve member defines a second window coupled in fluid communication with the inlet port, and the area of the second window is adjustable by axial movement of the valve member to adjust the flow rate of fuel through the second window, and the valve member defines a fuel passageway extending through the interior of the valve member and coupled in fluid communication with the second window for receiving fuel flowing through the second window, and the valve member defines an outlet port coupled in fluid communication with the internal fuel passageway for discharging fuel from the second window flowing through the internal fuel passageway;

a first fuel manifold coupled in fluid communication with the first outlet port for receiving fuel flowing through the first outlet port; and at least one first fuel nozzle coupled in fluid communication with the first fuel manifold for receiving fuel flowing through the first fuel manifold.

11. A fuel control system as defined in claim 10, wherein the valve member defines a third window coupled in fluid communication with the first fuel manifold, and the area of the third window is adjustable by axial movement of the valve member to control the flow of fuel through the third window.

12. A fuel control system as defined in claim 11, wherein the sequence valve includes a second outlet port coupled in fluid communication with at least one second fuel nozzle and coupled in fluid communication with the third window for directing fuel flowing from the first fuel manifold through the third window and to the at least one second fuel nozzle.

13. A fuel control system as defined in claim 10 wherein the valve member defines a third window coupled in fluid communication between the inlet port and at least one second fuel nozzle, and the area of the third window is adjustable by axial movement of the valve member to control the flow of fuel from the inlet port through the third window and to the at least one second fuel nozzle.

14. A fuel control system as defined in claim 13, wherein the third window is coupled in fluid communication between the second window and the at least one second fuel nozzle for controlling the flow of fuel from the second window to the at least one second fuel nozzle.

15. A fuel control system as defined in claim 12, wherein the sequence valve includes a first nozzle line coupled in fluid communication with the outlet port of the valve member for receiving fuel flowing through the outlet port, and the valve member defines another window coupled in fluid communication between the outlet port of the valve member and a second fuel line for receiving fuel flowing through the outlet port, the area of the window being adjustable by axial movement of the valve member.

16. A fuel control system as defined in claim 10, further comprising a position sensor coupled to the valve member and transmitting signals indicative of the axial position of the valve member, and a control unit coupled to the position sensor and to the sequence valve and responsive to the signals transmitted by the position sensor to adjust the position of the valve member.

17. A fuel control system as defined in claim 10, further comprising a pressure regulating valve coupled in fluid communication with the inlet port of the sequence valve, and including means for maintaining the pressure of fuel flowing into the inlet port above a threshold pressure value.

18. A fuel control system comprising:

a sequence valve including a housing defining a hollow interior, an inlet port for receiving fuel flow into the sequence valve, an axially-movable valve member received within the hollow interior, wherein the axial position of the valve member is adjustable to control the flow of fuel through the sequence valve, and the valve member defines a first window coupled in fluid communication with the inlet port for receiving fuel flowing through the inlet port, and the area of the first window is adjustable by axial movement of the valve member to adjust the flow rate of fuel through the first window, and the valve defines an outlet port coupled in fluid communication with the first window for receiving fuel flowing through the first window;

a first fuel manifold coupled in fluid communication with the outlet port for receiving fuel flowing through the outlet port;

at least one first fuel nozzle coupled in fluid communication with the first fuel manifold for receiving fuel flowing through the first fuel manifold;

a first valve control line coupled to the sequence valve for directing relatively high pressure fuel to the sequence valve, and a second valve control line, wherein the valve member defines a first position for directing relatively high pressure fuel from the first valve control line to the second valve control line, and a second position for directing relatively low pressure fuel to the second valve control line for controlling fuel flow to the at least one first fuel nozzle.

19. A fuel control system as defined in claim 18, further comprising at least one shut-off valve coupled between the first fuel manifold and the at least one first fuel nozzle, the at least one shut-off valve also being coupled to the second valve control line and responsive to the relatively high pressure fuel in the second valve control line to prevent the flow of fuel from the first fuel manifold to the at least one first fuel nozzle, and responsive to the relatively low pressure fuel in the second valve control line to permit the flow of fuel from the first fuel manifold to the at least one first fuel nozzle.

* * * * *